United States Patent Office 2,967,141
Patented Jan. 3, 1961

---

2,967,141

NEUTRONIC REACTOR FUEL ELEMENT

Marion L. Picklesimer, Knoxville, and William C. Thurber, Oak Ridge, Tenn., assignors to the United States of America as represented by the United States Atomic Energy Commission No Drawing. Filed Nov. 18, 1957, Ser. No. 697,292

3 Claims. (Cl. 204—193.2)

Our invention relates generally to the neutronic reactor fuel-element art and more specifically to a novel fuel-element powder compact.

As is well known, aluminum has become a standard material of fabrication in the neutronic reactor art, due primarily to its low cost and its relatively low absorption cross section for thermal neutrons. Aluminum has a cross section of only 0.21 barn. The metal has been used extensively in the fabrication of sandwich-type fuel elements that have been used successfully in the Materials Testing Reactor (MTR) which is described in the co-pending application of the common assignee Serial No. 360,190, filed June 8, 1953, now U.S. Patent No. 2,832,732, issued on April 29, 1958, in the name of Eugene P. Wigner for "Neutronic Reactor." The MTR is also described completely in the report "Materials Testing Reactor Project Handbook," TID-7001, available from the Office of Technical Services, Department of Commerce, Washington, D.C.

The MTR type fuel element is composed of an assembly of curved plates, each curved plate being a "sandwich-type" sub-assembly. In the powder-compact fuel plate, the inner or central fuel-bearing portion comprises an enriched uranium powder and an aluminum powder. The entire central portion is protected by a layer of aluminum to prevent exposure of the fuel material to reactor cooling media and to enclose the by-products of fission. The powder-compact fuel element is fabricated by a highly complex process which is described in the Geneva Conference paper "MTR-Type Fuel Elements," J. E. Cunningham and E. J. Boyle, A/Conf. 8/P/953, July 6, 1955.

In the prior art, $UO_2$ has been used as the uranium bearing powder in the MTD-type fuel element but $UO_2$ and aluminum have been found to be excessively reactive at the temperatures encountered in the fuel-element fabrication process. Since the fuel plates may be assembled into fuel elements with spacing as close as 0.1 inch, it is apparent that no buckling or warpage of the plates can be tolerated. It was found that the reaction of $UO_2$ with aluminum produced changes in the dimensions of the fuel plates which could not be tolerated in the final fuel-element assembly. Much work has been done to eliminate or control the reaction of $UO_2$ with aluminum with some success. Although the reaction has been controlled somewhat, it has not been eliminated completely and fuel elements which utilize $UO_2$ and aluminum are not completely satisfactory.

In powder-compact fuel elements, it is very desirable to utilize a high density material as a fissionable-fuel bearing medium. $UO_2$ was selected because of its high density (10.95 g./cc.) therefore it is desirable and even necessary for some fuel elements to retain a density at least as high as the density of $UO_2$ in any material that is selected for replacement of $UO_2$ in the matrix. A high density is advantageous in that the fuel occupies a small volume in the matrix, thereby making fabrication easier.

$UO_2$ which is used in powder-compact fuel elements must be carefully prepared in order to minimize the $UO_2$-Al reaction. Consequently, the $UO_2$ production process is relatively expensive as a result of the rigid quality control which must be maintained. Accordingly, it would be very desirable to utilize a compound which can be prepared by a more economical process. It is also desirable to use aluminum as a part of the compact since the metal has nuclear, physical, chemical, and economic properties that are particularly well suited for neutronic reactor use.

It is, therefore, an object of our invention to provide novel, fissionable-fuel bearing powders which are non-reactive with aluminum at the conditions encountered during fabrication into powder-compact neutronic-reactor fuel elements and at the conditions encountered during their use in a neutronic reactor.

Another object of our invention is to provide high-density powders which are non-reactive with aluminum at the conditions encountered during fabrication into powder-compact neutronic-reactor fuel elements.

A further object of our invention is to provide powders for powder-compact neutronic-reactor fuel elements which can be produced by a relatively economical process.

A still further object of our invention is to provide a process for fabricating the novel fuel bearing powders into plate-type fuel elements.

These and other objects of our invention will become apparent from the following detailed description of our invention when read in conjunction with the appended claims.

In accordance with our invention, we provide a novel neutronic-reactor fuel composition, which comprises a mixture of aluminum and a uranium carbide composition containing at least 80 weight percent $UC_2$. We have discovered that uranium carbide compositions which contain at least 80 weight percent $UC_2$ are essentially non-reactive with aluminum and consequently display no growth at elevated temperatures. Uranium carbides have high densities, and they can be prepared by an economical process.

The concentration of the uranium carbide composition in the powder-compact portion is governed primarily by the design of the nuclear reactor in which the fuel composition is destined to be used, and by the degree of enrichment of the uranium in the $U^{235}$ isotope. For fabrication purposes, however, the concentration of the carbide composition should be less than 80 weight percent.

The density of the carbide composition increases with a decrease in the concentration of $UC_2$ in the composition, but the reactivity also increases with a decrease in $UC_2$. Consequently, dual criteria exist simultaneously within the operable range of our invention. The $UC_2$ concentration in the carbide composition should be at least 80 weight percent. For a minimum reactivity with aluminum the $UC_2$ concentration in the carbide composition should be 100%, but for a maximum composition density, the concentration should be 80 weight percent. If, in the preparation of the carbide composition, a uranium-carbon composition containing more than 9.16 weight percent carbon is used, there will result, upon cooling, a mixture of $UC_2$ and free carbon in the form of graphite. We have found that free graphite has no deleterious effect upon the chemical reactivity of the composition, but the presence of graphite, which has a density of 2.25 g./cc., does have a detrimental effect upon the density of the composition. Accordingly, a relatively small amount of free graphite (~ up to 10 weight percent) can be tolerated, its concentration to be determined by density requirements of the final product.

Uranium carbide compositions can be prepared by several techniques. Preferably, the desired amount and proportions of uranium and carbon are arc-melted in an argon atmosphere and then allowed to solidify. U-C compositions can also be prepared by reacting various amounts of carbon with $UO_2$ at temperatures near 2500° C. and cooling the resultant carbide composition. In addition, stoichiometric UC and stoichiometric $UC_2$ can be prepared by either of the above methods and then combined to give the desired $UC_2$ concentration, but it is preferable that the final composition be a homogeneous mixture of the carbides, such as the homogeneous product which is derived from a molten uranium-carbon composition, in order to obtain a minimum reactivity of the final composition with aluminum.

The final fuel composition, which is a mixture of aluminum with a uranium-carbide composition, is preferably prepared from aluminum powder sized to —100 mesh and a carbide composition sized to —100 mesh. The two powders are blended completely and then compacted at 33 t.s.i. to form a powder-compact.

Uranium monocarbide (UC) and uranium dicarbide ($UC_2$) are the two principal carbides of uranium. Uranium sesquicarbide ($U_2C_3$) has been observed under favorable conditions, but it has very little practical application to our invention. Table I summarizes the physical properties of these carbides.

TABLE I
*Properties of uranium carbides*

| Compound | Chemical Formula | Carbon Content (Wt. Percent) | Density [1] (g./cc.) | Melting Point (° C.) | Crystal Structure | Lattice Constants | | Pyrophoric |
|---|---|---|---|---|---|---|---|---|
| | | | | | | $a_0$, A | $C_0$, A | |
| Uranium Monocarbide | UC | 4.80 | 13.63 | 2,250 | f.c.c. | 4.951 | | Yes |
| Uranium Sesquicarbide | $U_2C_3$ | 7.04 | 12.88 | 2,350-2,400 | b.c.c. | 8.088 | | ? |
| Uranium Dicarbide | $UC_2$ | 9.16 | 11.68 | 2,350-2,400 | b.c.t. | 3.517 | 5.987 | Yes |

[1] From lattice parameter measurements.

It can be seen all of the carbides have densities greater than the density of $UO_2$, which has a density of 10.95 g./cc.

TABLE II
*Constitution of uranium carbides*

| Sample | Carbon Content, Wt. Percent | Relative Amounts of Phases Present | | | |
|---|---|---|---|---|---|
| | | $UC_2$ | UC | C | U |
| 1 [1] | 9.24 | 99 | 0 | Trace | 0 |
| 2 | 9.20 | 95 | 5 | 0 | 0 |
| 3 | 8.24 | 90 | 10 | 0 | 0 |
| 4 | 7.98 | 80 | 20 | 0 | 0 |
| 5 | 6.96 | 50 | 50 | 0 | 0 |
| 6 | 5.75 | 10 | 90 | 0 | 0 |
| 7 | 4.46 | 0 | 99 | 0 | 1 |

[1] Prepared by reaction of C with $UO_2$.

The carbide compositions were then crushed to —100 mesh in an argon-filled dry box, blended with an equal weight of —100 mesh aluminum in an oblique blender for 3 hours, and cold pressed into a cylindrical die cavity at 33 t.s.i. to form a compact approximately 0.8 inch in diameter and 1 inch long.

The resultant compacts were fired in a vacuum furnace at 620° C. for varying lengths of time at a pressure of less than 0.1 micron of Hg. The fired compacts were evaluated by measurements of dimensional changes in order to determine the relative reactivity of each sample. Table III is a summary of the results of our experimental work.

TABLE III
*Reaction between uranium carbides and aluminum at 620° C.*

| Hours at 620° C. | 50% Sample 1 + 50% Al | 50% Sample 2 + 50% Al | 50% Sample 3 + 50% Al | 50% Sample 4 + 50% Al | 50% Sample 5 + 50% Al | 50% Sample 6 + 50% Al | 50% Sample 7 + 50% Al | 50% Sample 7 + 50% Al |
|---|---|---|---|---|---|---|---|---|
| 4 | | | NG | NG | NG | NG | $\Delta V=1.2\%$ | |
| 10 | | | NG | NG | NG | NG | $\Delta V=70.8\%$ | Disintegrated |
| 16 | | | NG | NG | NG | NG | $\Delta V=90.5\%$ | |
| 24 | NG | NG | NG | NG | NG | $\Delta V=4.6\%$ | | $\Delta V=109.7\%$ |
| 48 | NG | NG | NG | NG | $\Delta V=0.6\%$ | $\Delta V=29.6\%$ | | |
| 72 | NG | NG | NG | NG | | | | |
| 96 | NG | NG | NG | | | | | |

NG=No growth.
$\Delta V$=Volume expansion.

We have conducted experiments with UC and $UC_2$ mixtures in order to determine their reactivity with aluminum at elevated temperatures. Initially, we found that $UC_2$ was completely non-reactive and that UC was reactive with aluminum at these elevated temperatures. Homogeneous carbide compositions containing amounts of carbon varying from approximately 4 weight percent (0% $UC_2$) to approximately 10 weight percent (0% UC) were prepared by arc-melting elementary uranium and carbon in an argon atmosphere and cooling the resultant products. One sample was prepared by reacting $UO_2$ with carbon at a temperature high enough to fuse the reaction products (~2500° C.). Table II shows the composition of these carbides.

The amount of growth ($\Delta V$) is indicative of the reactivity of the various carbide compositions which were investigated. It can be seen that compositions containing more than 80 weight percent $UC_2$ were completely non-reactive with aluminum as evidenced by the absence of any volume change. Trace quantites of $UAl_3$ and $UAl_4$ were found in some samples but their concentration was insufficient to cause any dimensional changes. In contradistinction, however, compositions which contained less than 80 weight percent $UC_2$ were characterized by changes in dimension varying from slight distortion to complete disintegration in the case of Sample 7. Sample 1, which was prepared by the reaction of $UO_2$ with carbon, did not display adverse reactivity, which indicates that reactivity is independent of the manner of composition preparation.

We further provide a novel fabrication method for the production of "sandwich-type" aluminum clad fuel plates. The method which we provide is similar to the fabrication method which has been used for the production of $UO_2$-aluminum plate type fuel elements. Briefly, the prior art $UO_2$-aluminum process is as follows: aluminum powder and enriched $UO_2$ powder are proportioned and blended and the amount of the powder mixture required for each core compact is loaded into a die cavity and hydraulically pressed under a pressure of 33 tons per square inch. Each pressed powder core is then completely jacketed by the picture frame technique and heated thoroughly at 590° C. The hot jacketed compact is then hot rolled from a starting thickness of 0.7 inch to final thickness of approximately 0.07 inch in order to achieve a sound metallurgical bond between the cladding and the core material. At this stage, the composite fuel plates are flux-annealed to prevent the formation of objectionable blisters which may occur in subsequent processing or during reactor service. The flux-annealing treatment comprises coating the surface of the fuel plates with a slurry mixture of alcohol and brazing flux and annealing for one hour at 610° C. After treatment, the water-soluble flux is removed by a scrub wash, the plates are dipped in an acid bath, and rinsed in hot water and dried. The composite fuel plates are then reduced cold in several passes to a final thickness and annealed for one hour at 590° C. A rough shearing and final machining to the desired dimensions follows.

We found that the above process was unsuitable for use with fuel elements containing uranium-carbide compositions. In particular, the flux annealing step described above was inadequate by itself to prevent blister formation in carbide-bearing fuel plates. In an effort to eliminate blister formation we initially attempted evacuation of the compressed compart at room temperatures and at a pressure of less than one micron of mercury. We discovered that evacuation at room temperature failed completely to eliminate or even reduce blister formation. In view of our initial failure, we attempted to reduce blister formation by evacuating at higher temperatures and discovered that blister formation could not be eliminated by evacuation at reasonable temperatures. For example, we subjected a group of fuel compacts to a vacuum of less than one micron at temperatures of 300° C. and found that all samples were characterized by intolerable blister formation. We did find, however, that blister formation unexpectedly could be eliminated by heating at a temperature of 600° C. for a period of 2 to 3 hours at one micron pressure. Accordingly, we have incorporated this high temperature low pressure treatment step into the above-described fabrication method which was used for $UO_2$-aluminum fuel plates and successfully produced blister-free plates.

The following example is given as illustrative of one manner in which our novel fuel composition can be successfully fabricated into aluminum clad "sandwich-type" fuel plates.

EXAMPLE 6

55.79 grams of $UC_2$ powder, sized to −100 mesh and enriched to 20 percent in the U−235 isotope, and 38.40 grams of aluminum, also sized to −100 mesh, were blended in an oblique blender for 3 hours. The blended powder mixture was pressed under a pressure of 33 tons per square inch, using a 0.001 inch thick aluminum foil on each face, to form a "green compact" 2.3 inches wide by 2.0 inches in length by 0.28 inch thick. The resultant "green core" was vacuum sintered at 600° C. for 3 hours in a vacuum of less than one micron. After sintering the edges of the core were cleaned by chamfering slightly and removing the resultant filings with an acetone-wet tissue. Nineteen of such cores are required for one fuel element.

Nineteen frames of aluminum 0.250 inch thick, 5.0 inches long, and 4.25 inches wide, were prepared and an opening 2.3 inches wide by 2.0 inches long was punched from the center of each frame. Thirty-four aluminum cover sheets 0.198 inch thick, 5.0 inches long, and 4.38 inches wide were prepared for use on the 17 short plates in the fuel element. Four aluminum cover sheets 0.295 inch thick, 5.0 inches long, and 4.38 inches wide were prepared to be used on the 2 long plates of the fuel element. The inner surfaces of all cover sheets were scratch-brushed to facilitate bonding. The 19 sintered cores were then pressed into the 19 "picture frames" under a pressure of 26 tons per square inch. All scratch-brushed cover sheets were welded onto both sides of the 19 "picture frames" by depositing a continuous weld bead along the two longest sides of the frame. These assembled billets were preheated 30 minutes at 600° C. in air and then rolled according to the following schedule, reheating 5 minutes between mill passes:

1st pass—15% reduction
2nd pass—20% reduction
3rd pass—20% reduction
4th pass—20% reduction
5th pass—25% reduction
6th pass—25% reduction
7th pass—25% reduction
8th pass—27% reduction
9th pass—30% reduction The two long plates were finished to a thickness of 0.070 inch and the seventeen short plates finished to a thickness of 0.055 inch. All plates were then flux-annealed for one hour at 607° C. using a slurry of Eutectric 190 flux in methyl alcohol as the fluxing agent. Plates were then washed and acid etched to remove the flux. A cold rolling followed, the long plates being reduced to a final thickness of 0.065 inch and the short plates to a final thickness of 0.050 inch. All plates were then stress-relieved by annealing for three quarters of one hour at 550° C. The plates were then sheared and machined to the desired width and length dimensions using a fluoroscope to center the powder compact. The long plates were machined to a final length of 28⅝ inches and the short plates to a length of 24⅝ inches. All plates were degreased and deburred, blister-annealed for one hour at 607° C., and radiographed at their ends to determine the quality of the core in that area.

These 19 plates were found, upon inspection, to be completely satisfactory for their incorporation into "MTR-type" fuel elements. Fuel plates which are made according to our invention as described in the above example can be used successfully in the Materials Testing Reactor (MTR), Bulk Shielding Reactor (BSR), and the Low Intensity Training Reactor (LITR), all of which are described in The Reactor Handbook, volume 2, AECD–3646, May 1955, and in other reactors of similar design.

The example given above is illustrative only and should not be interpreted as limiting our novel composition or the method of its fabrication into aluminum-clad "sandwich-type" fuel plates. Many modifications and deviations from the above example can be made within the scope of our invention. For example, our novel fuel composition can be used without a cladding in closed cycle gas cooled reactors as described in the co-pending application of the common assignee Serial No. 578,278, now U.S. Patent No. 2,837,477, issued on June 3, 1958. Also particle sizes, $UC_2$ concentrations, methods of preparing the carbide compositions, and physical size and geometry of the fuel plates are some of the variables which can be changed from the values given in the example above. Accordingly, our invention should be interpreted in the light of our description

Having thus described our invention, we claim:

1. A neutronic-reactor fuel consisting essentially of a mixture of aluminum particles and uranium carbide particles, said uranium carbide particles consisting essentially of a homogeneous mixture of UC and $UC_2$, the concentration of $UC_2$ in said uranium carbide mixture being at least 80 wt. percent.

2. In a fuel element comprising a central powder-compact fuel portion and an outer cladding to protect said central fuel portion, an improved central powder-compact fuel composition consisting essentially of a mixture of aluminum particles and uranium carbide particles, said uranium carbide particles consisting essentially of a homogeneous mixture of UC and $UC_2$, the concentration of $UC_2$ in said uranium carbide mixture being at least 80 wt. percent, said central portion containing less than 80 wt. percent of said uranium carbide mixture.

3. In a process for the fabrication of fuel plates for plate-type neutronic reactor fuel elements, said plates each comprising a central aluminum-uranium carbide composition powder compact surrounded completely by a thin cladding of aluminum, the improvement which comprises heating said central powder compact at 600° C. at pressures of approximately 1 micron for at least one hour prior to sealing said aluminum cladding.

References Cited in the file of this patent

International Conf. on Peaceful Uses of Atomic Energy, vol. 9, 1955, pp. 196–202. Copy in Library.

CF–56–12–117, December 27, 1956, Nuclear Science Abstract, 11:3071, 1957. Copy in Library.